United States Patent [19]

Hella et al.

[11] 4,456,811

[45] Jun. 26, 1984

[54] METHOD OF AND APPARATUS FOR HEAT TREATING AXISYMMETRIC SURFACES WITH AN ANNULAR LASER BEAM

[75] Inventors: Richard A. Hella, North Andover; John V. Staal, Needham, both of Mass.

[73] Assignee: Avco Everett Research Laboratory, Inc., Everett, Mass.

[21] Appl. No.: 390,176

[22] Filed: Jun. 21, 1982

[51] Int. Cl.³ ............................................. B23K 27/00
[52] U.S. Cl. ...................... 219/121 LM; 148/11.5 R; 219/121 L; 219/121 LQ
[58] Field of Search ..... 219/121 L, 121 LM, 121 LP, 219/121 LQ, 121 LE, 121 LF, 121 LG, 121 LN; 148/11.5 R, 13, 141, 121

[56] References Cited

U.S. PATENT DOCUMENTS

| 3,702,973 | 11/1972 | Daugherty et al. | 331/94.5 |
| 3,808,553 | 4/1974 | Locke et al. | 331/94.5 |
| 3,848,104 | 11/1974 | Locke | 219/121 |
| 3,865,564 | 2/1975 | Jaeger et al. | 219/121 LF X |
| 3,981,705 | 9/1976 | Jaeger et al. | 219/121 LQ X |
| 4,017,708 | 4/1977 | Engel et al. | 219/121 |
| 4,044,936 | 8/1977 | Obersby et al. | 219/121 LP X |

*Primary Examiner*—C. L. Albritton
*Attorney, Agent, or Firm*—M. E. Frederick

[57] ABSTRACT

This invention is directed to a method of and apparatus for heat treating axisymmetric surfaces such as inner and outer surfaces on pipes, shafts, gears, valve seats and the like with a laser beam. An annular laser beam is provided and caused to impinge on a segmented generally conical mirror which focuses and/or directs the laser beam onto the desired surface of a work piece as an annular or ring-shaped beam with a predetermined width and energy profile. Relative movement about the axis of the laser beam may be provided between the work piece and the laser beam to average any intensity distributions around the laser beam. Additionally, relative movement along the axis of the laser beam may also be provided between the work piece and the laser beam in the case of shafts, pipes and the like to provide uniform and non-overlapping coverage of the surface to be treated.

9 Claims, 6 Drawing Figures

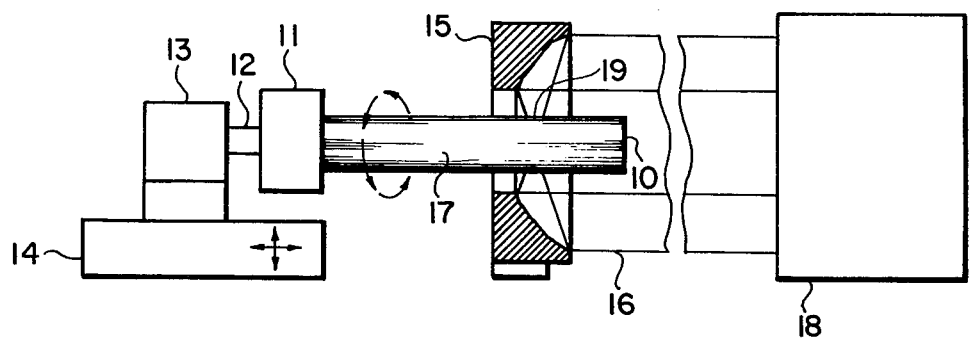
Fig. 1
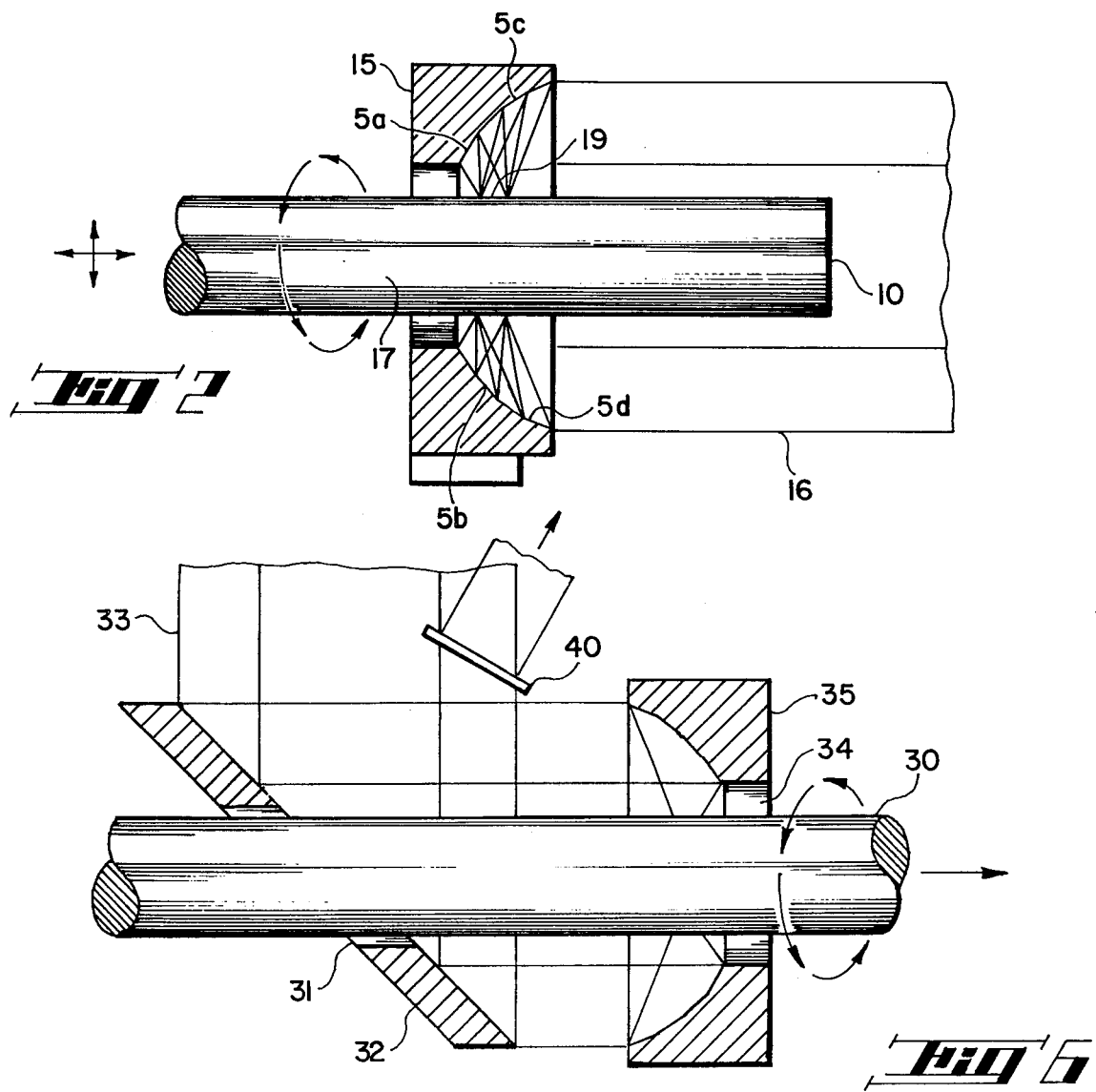
Fig. 2
Fig. 4

METHOD OF AND APPARATUS FOR HEAT TREATING AXISYMMETRIC SURFACES WITH AN ANNULAR LASER BEAM

BACKGROUND OF THE INVENTION

The present invention relates to methods and apparatus for heat treating surfaces and particularly for heat treating metal surfaces by directing a high power laser beam to the surface.

Metals are heat treated in different ways for different purposes. For example, high carbon metal parts such as springs are made stronger by heating them above their critical temperature and then cooling them. A journal or a shaft may be hardened by a number of techniques so that it will wear better. One technique for low carbon metal parts such as shafts is to heat the shaft in an atmosphere of selected gas or liquid so that materials dissolve from the gas or liquid in the surface metal of the shaft. A hard surface is then produced by heating and a rapid quench. The depth of this hardening depends upon the temperature and time of exposure to the atmosphere. This is a conventional process and is called "case hardening". Three commonly used types of case hardening are carburizing, nitriding, and cyaniding. For example, a steel shaft is case hardened by heating the shaft in an atmosphere of $CO_2$ to a temperature in the range of 1700° F. and at this temperature exposing the shaft to the $CO_2$ gas for a period of an hour or two and then quenching the shaft. Minute amounts of carbon are liberated on the surface of the hot metal and dissolve in the metal. Upon quenching, the carbon becomes part of the crystalline structure of the metal at the surface.

Case hardening of high carbon metals can also be accomplished by induction heating. An induction coil enclosing the metal piece to be case hardened induces an electromagnetic field and currents in the metal that flow just along the surface whereby the surface of the metal piece is preferentially heated. If the surface is thusly heated above the critical temperature and then the piece is quenched, the surface only of the metal piece becomes hardened. Clearly, the conventional techniques for case hardening, whether heating a metal piece in a selected gaseous atmosphere as in the carburizing process, or by selectively heating only the surface of the piece by induction are quite limited as to the shape and size of the pieces that can be case hardened. For example, it is difficult to harden only selected portions of the surface of a shaft using either the carburizing technique or the induction heating technique. Thus, by these conventional techniques, odd geometries or selected portions of a piece are most difficult to preferentially harden. Furthermore, the ability to control the depth of the case hardening whether using the carburizing technique or the induction heating technique is quite limited.

Recently, it has been proposed to selectively heat the surface of a metal piece by directing a high power laser beam to the surface over areas of the surface which are treated with a material selected, for example, to absorb the energy of the beam. The advantages of this technique are that selected areas of the surface of the metal piece can be coated with the material so that when the beam sweeps the surface of the metal piece, only those areas covered with the material will be heated. The scanning laser beam selectively heats the surface of the metal piece to a temperature above the critical temperature without raising the bulk temperature of the piece sufficient to cause any serious distortion or other affects of heating. The power density of the beam may be controlled to heat the surface of the metal piece above the critical temperature to a depth of from a few thousandths of an inch to about fifty thousandths of an inch. Thereafter, the quenching of the surface occurs by conduction of heat out of the surface into the base metal. Since the surface layer heated by the laser beam is shallow, the conduction quench rate is very fast.

A high power laser beam may be a solid or pencil laser beam that is an inch or so in diameter away from the focal point and a fraction of an inch in diameter at the focal point. The intensity distribution across the diameter of this beam, also called the intensity profile or intensity shape of the beam, depends very much on the type of laser. One common profile or beam shape for a pencil beam is a Gaussian shape whereas in some lasers the laser beam away from a focal point is annular or hollow and so in this case, the intensity profile is generally U-shaped. If the sweeping laser beam directed to the surface of a metal piece has a distinct Gaussian shape, it is quite clear that heating of the metal surface at the center of the beam will be a great deal more intense than heating along the edge of the beam. When such a beam is swept across the metal surface and the beam scans do not overlap, the surface is not heated uniformly and so the depth of hardening will not be uniform throughout the area of the metal surface scanned by the laser beam. On the other hand, if the repeated scans of the laser beam on the surface of the metal overlap, the portion of a given scan which is overlapped on the next scan of the beam will cool somewhat between the scans and so either will not be heated sufficiently to raise the temperature above the critical temperature or the reheating by the subsequent scan will anneal the metal at the surface where the repeated scans overlap and so negate the hardening affect at the overlapping areas. The result is that hardening of the scanned metal surface is not uniform in hardness nor in depth of hardening.

One type of high power laser is a flowing gas electron beam energized $CO_2$ laser. A laser of this type is described in U.S. Pat. No. 3,702,973 which issued Nov. 14, 1972 and another is described in U.S. Pat. No. 3,808,553 issued Apr. 30, 1974. These lasers produce an annular or ring-shaped laser beam having a power on the order of 10–20 kilowatts and so these lasers are suitable for heating a surface of a metal piece to, for example, case harden the surface. The beam from these lasers is annular in shape and hence have a generally U-shaped as distinguished from a Gaussian intensity profile except at the focal point of the beam where the beam characteristics are that of a Fraunhofer diffraction pattern with a central core containing anywhere from 5 to 80% of the power of the beam and the remainder of the beam power being located in concentric Airy rings around the central core. The intensity distribution at locations of the beam other than the focal point depend upon the beam divergence angle and the annular ratio. However, in general, the intensity distribution or profile of this annular beam always contains rings around a central maximum as well as the possibility of a depression in the middle of the beam due to the near field annular characteristics of the beam. In all cases, the intensity distribution or shape of the beam depends on the type of laser oscillator that is used and on the location along the beam relative to the focal point. Most often, however, the intensity profile is not ideal for uniformly heating the surface of a metal piece to, for example, case harden the surface. U.S. Pat. No. 3,848,104 issued Nov. 12, 1974 describes apparatus for spacially oscillating an annular high power laser beam focused substantially to a spot whereby the cross-section dimensions of the spacially oscillated or "dithered" laser beam is substantially greater than the initial beam at the point of impingement on the surface to be treated and covers an area considerably greater than that which would be covered by the same beam were it not dithered. The surface to be treated is then swept by the "dithered" beam.

It is a principal object of the present invention to provide a technique for producing from an input annular laser beam a laser beam that is tailored to provide at the surface of a work piece an annular shape of desired cross sectional area and intensity profile independent of that of the input laser beam.

U.S. Pat. No. 4,017,708 issued Apr. 12, 1977 describes a method of heat treating a bore in a work piece that may utilize an axially positionable rotating conical mirror structure with a single continuous reflective conical surface to receive an annular output laser beam and direct it onto the inner surface of a bore in a work piece such as a cylinder sleeve. The conical mirror provides a generally circumferentially disposed heating zone or ring-shaped focal pattern by focusing and reflecting as a single operation the impinging annular laser beam on the surface to be processed to provide a heating zone of the desired width but having the same energy profile as the output laser beam.

A conventional conical mirror of the type disclosed in the aforementioned U.S. Pat. No. 4,017,708 is effective only to decrease the impinging laser beam width as a function of cone angle. Such a conventional conical mirror will project an annular laser beam of the desired width for only a narrow range of conditions and requires accurate beam alignment and good beam symmetry. Further, the energy profile or distribution of the output laser beam in this case is not amenable to modification. Thus, such an arrangement is not satisfactory, for example, where the input laser beam has an unsatisfactory and/or nonuniform radial energy distribution in either the focused or unfocused condition. Such an arrangement is further unsatisfactory, for example, for heat treating a valve seat where compensation of the energy distribution of the laser beam is necessary for the heat sink effect of the work piece and to prevent melting at the edges of the valve seat. Another application where the capability to modify the energy distribution of a laser beam is important is for heat treating the outer surface of shafts and the surface of a bore. In these cases, we have found that in many cases, it is desirable to have a higher beam intensity at the leading edge of the beam as it traverses the surface to be treated.

SUMMARY OF THE INVENTION

In accordance with the present invention, an annular output laser beam is provided and caused to impinge on a segmented mirror or focusing means which circumferentially receives an annular output laser beam and projects it onto an axisymmetric surface to be treated with a predetermined width and energy profile deemed appropriate for the surface being processed. As used herein, the term "annular input laser beam" includes doughnut-shaped laser beams, generally C-shaped laser beams, and laser beams having a generally rectangular or square shape rather than circular. In the case of a shaft, pipe or the like, the mirror, annular in shape to match that of the input laser beam, may be disposed on and surround the longitudinal axis of the beam so that the focused beam impinges circumferentially on the outer surface of the shaft, pipe or the like. The shaft, pipe or the like may be caused to simultaneously be rotated about and moved along its longitudinal axis so that all parts of the projected laser beam uniformly sweep over the entire surface to be treated. This prevents the existence of overlapping regions and areas of hardness different than other areas.

The conical segments of the mirror are selected and shaped to provide a predetermined width and energy profile of the beam focused on the surface and deemed appropriate for the surface being processed. Thus, a collimated annular output laser beam may be directed to the segmented mirror, the portion of the laser beam reflected from each segment being combined at the portion of the surface to be processed to provide a reflected laser beam having an intensity distribution with a uniformity that is a function of the total number and configuration of segments. Thus, the reflected laser beam may be focused to a desired width with substantially any desired intensity distribution, the intensity distribution being limited only by the number and configurations of segments one is able to generate. Accordingly, a laser beam reflected on the surface of a work piece may be easily provided with a greater energy density at its leading edge or, alternately, a lesser (or greater) energy density at both of its edges.

For processing a valve seat, the width of the reflected laser beam may be made substantially that of the valve seat with the energy density at the edges reduced over that in the center portion of the reflected laser beam to prevent melting of the valve seat at these regions while effecting the desired and substantially same degree of heat treating at all points of the valve seat.

If merely greater uniformity is desired, this may be easily and simply provided by defocussing the input laser beam to increase its cross-sectional area and then directing it to a segmented mirror having a large number of segments so that each reflected segment, comprising a small portion of the input laser beam, is distributed over the entire width of the heat treating zone.

Still further, segmentation of an annular input laser beam in accordance with the invention provides a more uniform energy distribution even if the input laser beam is focused to a line. This is because an input laser beam focused to a line as shown and described, for example, in the aforementioned U.S. Pat. No. 4,017,708, generally has a greater energy density at its center part inherently resulting from the optics involved in the focussing of the beam.

It is an object of the present invention to provide an improved high power laser system for heat treating an axisymmetric surface.

It is another object to provide an improved high power laser system and method for scanning an axisymmetric metal surface to heat treat the surface.

It is another object of the present invention to provide a high power laser system and method for heating an axisymmetric surface to a prescribed and uniform temperature and depth.

It is another object of the present invention to provide apparatus and method for heat treating axisymmetric surfaces with a reflected annular laser beam having a predetermined energy profile at the work surface different than that of the incident laser beam.

It is another object of the present invention to provide apparatus and a method for heat treating axisymmetric surfaces with an annular laser beam reflected from a segmented mirror which projects a series of annular beams which are superimposed on the surface to be processed to form a predetermined energy distribution.

These and other objects and features of the present invention will be more apparent in view of the specific description of embodiments of the invention which represent the best-known uses and applications of the invention all taken in conjunction with the figures described below.

DESCRIPTION OF THE DRAWINGS

FIG. 1 is a diagram of apparatus in accordance with the invention for treating cylindrical shafts;

FIG. 2 is a fragmentary sectional view showing the segmented mirror and shaft work piece of FIG. 1 on an enlarged scale;

FIG. 3 is a diagram of apparatus in accordance with the invention for treating axisymmetric surfaces having a conical configuration such as valve seats and the like;

FIG. 5 is a diagram of apparatus in accordance with the invention for treating the inner surface of hollow shafts and the like; and FIG. 6 is a diagram of alternate apparatus in accordance with the invention for treating cylindrical shafts.

DESCRIPTION OF EMBODIMENTS OF THE INVENTION

Figure 3:
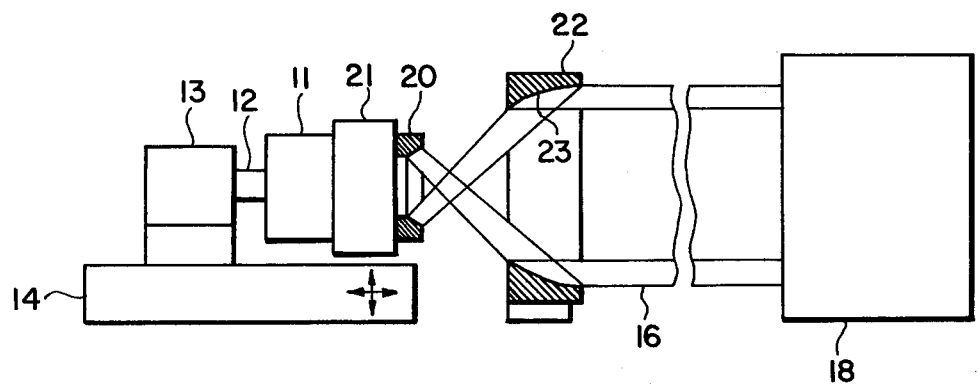

Referring now to FIG. 1 and FIG. 2, there is shown a cylindrical shaft 10 or the like, the outer surface 17 of which is to be heat treated. One end of the shaft 10 is held as by a conventional chuck 11 carried by the rotatably driven member 12 of a suitable and conventional rotary drive means 13. The rotary drive means 13 may be mounted on and carried by a conventional indexing table 14 adjustable preferably in both the vertical and horizontal directions. Operatively associated with the shaft 10 is a segmented, typically conical, mirror or focusing member 15 adapted to receive along the axis of the mirror 15, as shown by way of example on an enlarged scale in FIG. 2, an annular laser beam 16 from a suitable laser source 18. The segmented mirror 15 circumferentially directs and focuses separate portions of the annular laser beam 16 to impinge circumferentially as at region 19 on the surface 17 of the shaft 10. The faces of segmented portions 15a, 15b, 15c and 15d of mirror 15 are formed in accordance with well-known optical mirror forming techniques to cause the incident laser beam 16 to be reflected as a series of annular beams which are superimposed at region 19 on the surface 17 of the shaft 10 to form a reflected beam having at the surface 17 to be heat treated the desired overall width defining region 19 and the desired energy distribution parallel to the longitudinal axis of the shaft 10. The width of the reflected beam will generally be determined by the power density of the incident laser beam and will be such as to effect the desired degree of heat treating. Similarly, the reflected portions of the incident beam are superimposed on the work surface to form the desired energy distribution or profile which, typically, is different from that of the incident laser beam.

Thus, by reflecting the incident laser beam as separate controllable portions, an averaging effect not otherwise possible is provided which greatly broadens, if not eliminates, requirements for accurate alignment, beam shape, and beam symmetry. Further, the ability to optimize and/or select the energy distribution in the width direction of the reflected beam for specific work pieces is a very important and valuable aspect of the present invention. For example, we have discovered that improved heat treating of valve seats not otherwise obtainable may be obtained if the energy distribution of the reflected beam is selected to compensate for the heat sink effect of the work piece and to eliminate melting at the edges of the valve seat face where the heat sink effect is minimal. For the case of heat treating a shaft as illustrated in FIG. 1, we have also found that improved heat treating is obtained if the reflected beam has a higher intensity at its leading edge as it traverses the surface of the work piece. Further, if the incident laser beam is separated into a plurality of segments and each is focused on the work piece at the same location so that they are superimposed one on another, non-uniformities or concentrations in energy distribution are spread out over the entire width of the portion of the work piece being irradiated, thereby improving beam symmetry. This, as earlier noted, results in optimization of the energy distribution and at least broadens the requirements for beam alignment, beam shape, and beam symmetry.

The laser beam 16, having the necessary power or energy, may be generated by any suitable laser and, if not inherently present, is caused in conventional manner to have an annular form and impinge on the reflective surface of the segmented mirror. Heat treating may vary, for example, from simply heating to melting of the surface. The diameter of the segmented mirror 15 and the shape, number, orientation and optical qualities of its reflective surfaces are selected, of course, for a given diameter or diameters of shafts, to provide the desired heating of the shaft surface.

For convenience, segmented mirror 15 is illustrated in FIG. 1 as having four conical segments 15a, 15b, 15c and 15d. It is to be understood that the number of segments, their configuration, and their orientation may vary as required to provide substantially any desired beam width and energy distribution at the surface of the work piece.

Upon selecting the magnitude of heat treating desired and the energy distribution of the reflected beam, the configuration, orientation and number of reflective segments are determined and formed in conventional manner. The present availability of computer controlled tools, such as lathes, grinders and the like, greatly simplifies the provision of substantially any desired combination of segments.

The numbered cross-sectional areas and angles of each segment may be determined in accordance with conventional optical designing procedures. Each such segment in conventional manner may be defined in coordinates and these coordinates used to control a suitable cutting machine used in precision diamond machining or operation of a numerically-controlled lathe. A numerically-controlled precision lathe may be used to rough-cut the segments, and then the segments may be finished by utilizing precision diamond machining.

The present invention permits the generation in axisymmetric parts or parts having axisymmetric surfaces of discrete heat treated regions without any of the above-noted disadvantages. Thus, as generally illustrated in FIG. 1, an annular laser beam is provided and caused to strike the segmented mirror 15 which projects the laser beam preferably onto the surface of the shaft and at the same focuses or decreases the annular width of the beam to a very small dimension with the desired energy distribution. The resulting laser beam pattern projected circumferentially onto the shaft is at its limit a line rather than a band. The shaft after its longitudinal axis is adjusted to be coincident with the longitudinal axis of the segmented mirror, is then most conveniently both rotated and transmitted through the circularly focused laser beam on an axis coincident with the axis coincident with the axis of the segmented mirror. The laser beam effects the desired heat treating of the surface of the shaft. Thus, with provision of an annular laser beam in combination with a segmented mirror in accordance with the invention for receiving and reflecting this beam as disclosed and in further combination with both rotation and translation of the surface to be treated, there are no non-uniform or overlap regions and, therefore, no potential areas in which the hardness can be less than an adjoining area.

Figure 4:
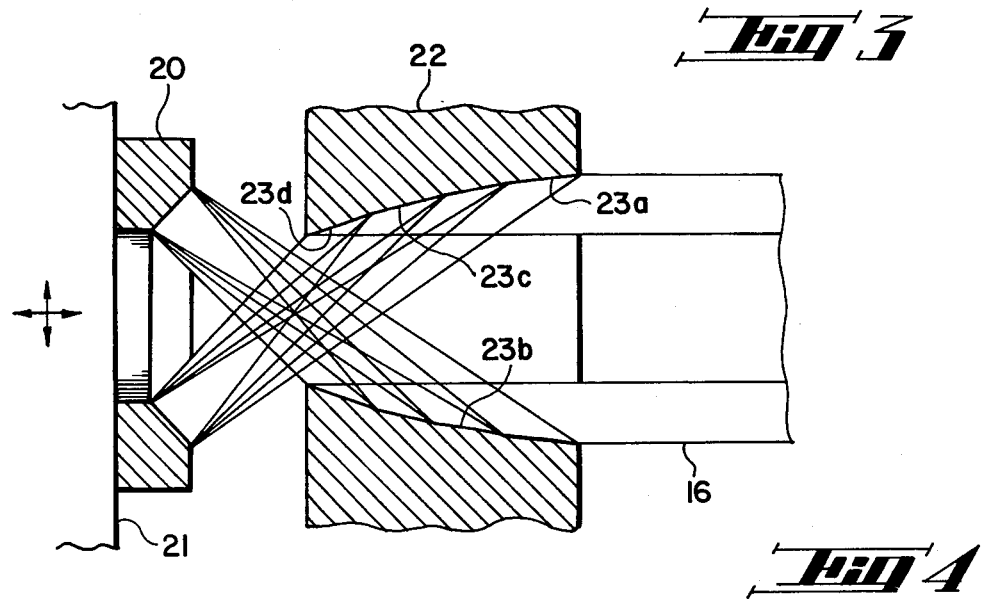
FIG. 4 is a fragmentary sectional view showing the segmented mirror and valve seat work piece of FIG. 3 on an enlarged scale.

The present invention is equally applicable to various other axisymmetrical shapes such as, for example, valve seats. As with shafts, the present invention permits a ring-shaped laser beam with a predetermined energy distribution of high intensity laser energy to be projected on the face of a generally conical valve seat or the like as illustrated by way of example in FIG. 3 and FIG. 4. The apparatus illustrated in FIG. 3 and FIG. 4 is the same as that in FIG. 1 with the exception of the part to be processed (a valve seat in this case), the orientation and configuration of the reflective surfaces of the segmented mirror, and the provision of a mounting block to hold the valve seat. The valve seat 20 is fixedly attached to a mounting block 21 which may be held by the chuck 11. Whereas in heat treating a shaft wherein the reflected beam from the segmented mirror is disposed substantially normal to the longitudinal axis of the segmented mirror, the segmented mirror 22 as shown in FIG. 3 and FIG. 4 is provided in conventional manner with a plurality of optically reflective, generally conical inner surfaces 23a, 23b, 23c and 23d that project the incident laser beam as a plurality of sections through the segmented mirror 22 in the direction away from the source 18 of the annular laser beam 16 as shown in FIG. 3. In this case, the reflected portions first converge and pass through the longitudinal axis of the segmented mirror and then diverge to impinge on the conical surface of the valve seat. As with shafts, the angle of incidence preferably is normal to the surface to be treated as shown in FIG. 3. It will now be seen that the above-described arrangement permits areas otherwise inaccessible or substantially inaccessible to be easily, quickly and uniformly heat treated. As with the shaft shown in FIG. 1, the valve seat is most conveniently rotated and translated if necessary to effect maximum uniform heating of the surface to be treated. Alternately, if desired, a conventional beam rotator (not shown) may be interposed between the laser source and the work piece to effect rotation of the beam with respect to the work piece.

Beam rotation in certain cases is desirable because it permits a large work piece such as a cylinder head with a plurality of valve seats or the like to be heat treated without the necessity of rotating the work piece. The work piece need only be mounted on an indexing table to permit proper location of the surface or surfaces to be treated and, if desired, movement toward and away from the segmented mirror.

It will be understood that the arrangement of FIG. 1, as well as that of FIG. 3, with minor modifications, may be easily and simply adapted to heat treat, for example, conical and other types of bearing raceways.

Figure 5:
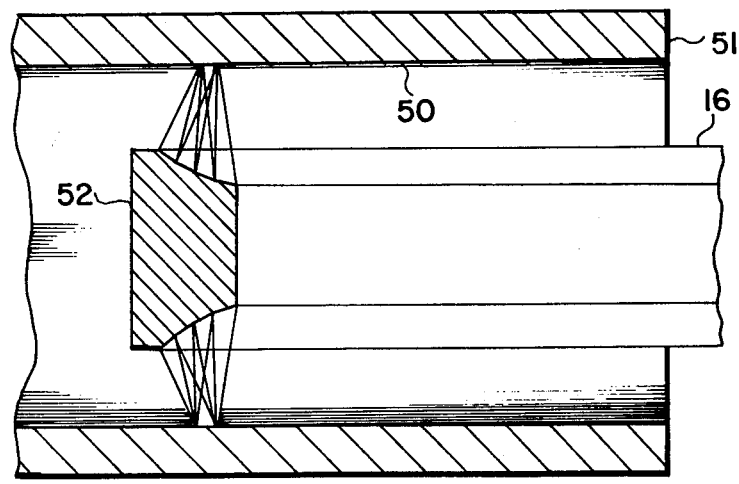

FIG. 5 illustrates an arrangement for heat treating the inner surface 50 of a hollow pipe or the like 51. In this case, the segmented mirror 15 of FIG. 1 is replaced with a segmented mirror 52 of such diameter and configuration as to freely fit within the hollow pipe or the like 51 and circumferentially receive an annular laser beam 53 and reflect it as separate portions, as and for the purposes previously discussed, on the inner surface 50 of the pipe 51 substantially in the same manner as described in connection with FIG. 1.

Directing attention now to FIG. 6, there is shown an alternate arrangement for treating shafts, pipes, and the like wherein, for example, the outer surface of a shaft may be heat treated in the same manner as in FIG. 1, but with the input laser beam being introduced at right angles to the shaft and thereby obviate any interference between the shaft and the input laser beam.

As shown in FIG. 6, the shaft 30 to be heat treated extends through a central opening 31 in a flat mirror 32 disposed at an angle to the longitudinal axis of the shaft. The flat mirror 32 is disposed at an appropriate angle to receive the off-axis annular input laser beam 33 (shown at right angles) and reflect it to the segmented mirror 35 identical to mirror 15 of FIG. 1. Mirror 35 reflects the received input laser beam 33 circumferentially onto the surface of shaft 30 as and for the purposes discussed in connection with FIG. 1. Shaft 30 is rotated and translated through the central opening 34 in segmented mirror 35 to permit uniform heat treating of all or such portion of the surface of shaft 30 as is desired.

If desired, the shaft 30 may be permitted to intercept that portion of the input laser beam falling on it. This will, of course, produce a generally C-shaped beam reflected from the surface of flat mirror 32. The shaft 30 is rotated to compensate for this introduced nonuniformity in the circumferential energy distribution of the input laser beam. If desired, a small interception mirror 40 may be disposed above the shaft 30 to intercept and direct away that portion of the input laser beam that would otherwise fall on the shaft. Such an interception mirror 40 will vary in size for different diameter shafts so that it will reflect only that part of the input laser beam that would otherwise fall on the shaft in the absence of such a mirror. The provision of an interception as shown in FIG. 6 prevents pre or postheating, depending on which way the shaft or the like is translated.

As in FIG. 1 and FIG. 3, the segments of the input laser beam separately reflected to the work surface are not shown for convenience.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. The method of heat treating exposed metal surfaces comprising the steps of:
   (a) providing a metal work piece having an axisymmetric exposed metal surface to be heat treated, said metal surface being concentric about an axis;
   (b) providing an annular laser beam having sufficient energy to effect the desired heat treating;
   (c) at least substantially circumferentially receiving and projecting said laser beam as a plurality of substantially separate annular segments on said metal surface concentric about said axis, said reflected segments being arrayed and directed with respect to each other toward said metal surface to define at said metal surface a heat treating zone having a predetermined energy distribution in a direction normal to the direction of the reflected segments; and
   (d) causing rotational motion between said surface and said reflected segments.

2. The method of claim 1 wherein said energy distribution is substantially constant.

3. The method of claim 1 wherein said heat treating zone has a front portion and a rear portion, and said energy distribution has a greater energy level at said front portion.

4. The method of claim 1 wherein said heat treating zone has a front portion, a center portion, and a rear portion and the energy level at said front and rear portions of said heat treating zone is insufficient to cause melting within the time necessary to produce the desired heat treating effect in the center portion of said heat treating zone.

5. The method of claim 1 wherein said surface is a cylindrical surface and said reflected segments are projected toward said surface, said surface is translated with respect to said reflected segments, said heat treating zone has a front portion and a rear portion, and said segments are arranged and directed to provide an energy distribution having a greater energy level at said front portion.

6. The method of claim 1 wherein said surface is a conical ring-shaped surface and said reflected segments are projected toward said surface, said heat treating zone has a center portion and two outer portions, and said segments are arranged and directed to provide an energy distribution having a greater energy level in the center portion of said heat treating zone.

7. The method of claim 6 wherein the energy level at both outer portions of said heat treating zone is insufficient to cause melting within the time necessary to produce the desired heat treating effect in the center portion of said heat treating zone.

8. The method of heat treating exposed metal surfaces comprising the steps of:
   (a) providing an elongated, cylindrical metal work piece concentric about an axis;
   (b) providing an annular laser beam having sufficient energy to effect the desired heat treating;
   (c) circumferentially receiving said laser beam at an angle to said axis and reflecting same parallel to and at least substantially surrounding said cylindrical work piece;
   (d) at least substantially circumferentially receiving and further reflecting said reflected laser beam as a plurality of substantially separate segments on the surface of said metal work piece concentric about said axis, said reflected segments being arrayed and directed with respect to each other toward said surface to define at said surface a heat treating zone having a predetermined energy distribution in a direction parallel to said axis; and
   (e) causing rotational and translational motion between said surface and said reflected segments.

9. The method of claim 7 wherein said laser beam is reflected parallel to said work piece from first reflective means having a first central opening through which said work piece passes, said laser beam is further reflected from second reflective means having a second central opening through which said work piece passes, and said laser beam incident on said first reflective means is prevented from impinging on said work piece.

* * * * *